(12) United States Patent
Hendriks (10) Patent No.: US 7,102,981 B2
(45) Date of Patent: Sep. 5, 2006

(54) OPTICAL SCANNING DEVICE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 595 days.

(21) Appl. No.: 10/012,021

(22) Filed: Dec. 5, 2001

(65) Prior Publication Data
US 2003/0103270 A1    Jun. 5, 2003

(51) Int. Cl.
*G11B 7/00* (2006.01)

(52) U.S. Cl. .................. 369/112.26; 369/121

(58) Field of Classification Search ........... 369/112.24, 369/44.27, 44.21, 44.23, 44.32, 44.17, 53.14, 369/53.22, 53.23, 53.28, 44.14, 53.11, 53.19, 369/53.2, 112.26; 385/93
See application file for complete search history.

(56) References Cited

U.S. PATENT DOCUMENTS

| | | | |
|---|---|---|---|
| 4,449,212 A | 5/1984 | Reno | |
| 5,175,783 A * | 12/1992 | Tatoh | 385/93 |
| 6,111,832 A * | 8/2000 | Tsuchiya et al. | 369/53.23 |
| 6,134,195 A * | 10/2000 | Kawamura | 369/44.23 |
| 6,314,064 B1 * | 11/2001 | Ueda et al. | 369/44.23 |
| 6,778,472 B1 * | 8/2004 | Nishikawa | 369/44.21 |
| 6,824,203 B1 * | 12/2004 | Yonezawa et al. | 369/44.27 |

FOREIGN PATENT DOCUMENTS

| | | |
|---|---|---|
| EP | 0865037 | 9/1998 |
| JP | 09063083 A | 3/1997 |
| JP | 9115170 | 5/1997 |
| JP | 09306012 A | 11/1997 |
| JP | 090472 A | 3/2000 |
| JP | 09115170 A | 3/2000 |
| JP | 01067700 A | 3/2001 |
| JP | 200167700 | 3/2001 |
| WO | WO 00/38182 | 6/2000 |

OTHER PUBLICATIONS

G. Bouwhuis et al., "Principles of Optical Disc System", Adam Hilger 1985, ISBN 0-85274-785-3, pp. 70-73 & 75-80.
B.H. Hendriks et al., "Designs and Manufacturing of Far-Field High NA Objective Lenses for Optical Recording", SPIE 3749, pp. 413-414, 1999.
K. Maruyama & R. Ogawa, "Background of Conception of DVD/CD Compatible Diffractive Lens" TA02 ODF 2000, Tokyo Nov. 16, 2000.

* cited by examiner

*Primary Examiner*—Paul W. Huber
(74) *Attorney, Agent, or Firm*—Michael E. Belk (57) ABSTRACT

An optical scanning device is used for scanning first and second information layers with first and second radiation beams. The device includes a radiation source and an objective lens assembly (31). The lens assembly includes a doublet-lens system (61, 62) including a first objective lens (61) with a first cross-section having a first diameter ($d_1$) and a second objective lens (62) with a second cross-section having a second diameter ($d_2$). The first and second lenses are arranged for transforming the first radiation beam to a first focused radiation beam having a first numerical aperture. The objective lens assembly further includes a third objective lens (63) for transforming the second radiation beam to a second focused radiation beam having a second, smaller numerical aperture. The second and third objective lenses (62, 63) are integrally formed in one body (64). In a preferred embodiment of the objective lens assembly, the second diameter is smaller than the first diameter.

10 Claims, 7 Drawing Sheets

Fig. 3a ("first mode")

OPTICAL SCANNING DEVICE

The invention relates to an optical scanning device for scanning a first information layer of a first optical record carrier with a first radiation beam and a second information layer of a second optical record carrier with a second radiation beam, the device including a radiation source for supplying said first and second radiation beams, and an objective lens assembly including: (1) a doublet-lens system including a first objective lens with a cross-section having a first diameter and a second objective lens with a cross-section having a second diameter, said first and second objective lenses being arranged for transforming said first radiation beam to a first focused radiation beam having a first numerical aperture to form a first scanning spot in the position of said first information layer, and (2) a third objective lens for transforming said second radiation beam to a second focused radiation beam having a second, smaller numerical aperture to form a second scanning spot in the position of said second information layer.

The invention also relates to an objective lens assembly for transforming a first radiation beam to a first focused radiation beam having a first numerical aperture and a second radiation beam to a second focused radiation beam having a second, smaller numerical aperture, the assembly including: (1) a doublet-lens system including a first objective lens with a cross-section having a first diameter and a second objective lens with a cross-section having a second diameter, said first and second objective lenses being arranged for transforming said first radiation beam to a first focused radiation beam having a first numerical aperture, and (2) a third objective lens for transforming said second radiation beam to a second focused radiation beam having a second, smaller numerical aperture.

"Scanning an information layer" refers to scanning by a radiation beam for: reading information from the information layer ("reading mode"), writing information in the information layer ("writing mode"), and/or erasing information from the information layer ("erase mode"). "Information density" refers to the amount of stored information per unit area of the information layer. It is determined by, inter alia, the size of the scanning spot formed by the scanning device on the information layer to be scanned. The information density may be increased by decreasing the size of the scanning spot. Since the size of the spot depends, inter alia, on the wavelength $\lambda$ and the numerical aperture NA of the radiation beam forming the spot, the size of the scanning spot can be decreased by increasing NA and/or by decreasing $\lambda$.

A problem commonly encountered with conventional optical scanning devices is the compatibility with optical record carriers having different formats, e.g. the so-called DVD-format and the so-called DVR-format, due to the difference in thickness of the transparent layers. In the following, "first mode" refers to an operating mode of the optical scanning device for scanning a first information layer with a first focused radiation beam having a first numerical aperture $NA_1$. The numerical aperture $NA_1$ is suitable for scanning an optical record carrier of a first type (e.g. the so-called DVR-format) having a first information density. "Second mode" refers to an operating mode of the optical scanning device for scanning a second information layer with a second focused radiation beam having a second numerical aperture $NA_2$ that is smaller than the first numerical aperture $NA_1$. The numerical aperture $NA_2$ is suitable for scanning an optical record carrier of a second, different type (e.g. the so-called DVD-format) having a second information density. In other words, the first mode is a mode of operation of the optical scanning device for scanning record carriers having a high information density and the second mode is a mode of operation of the optical scanning device for scanning record carriers having a low information density. The "free working distance," i.e. the distance between the objective lens and the position of the information layer to be scanned, is a critical parameter when scanning record carriers having different formats, since the free working distance decreases when the thickness of the transparent layer of the record carrier increases, when the same objective lens is used for scanning in both first and second modes and operates at the same conjugate distance, i.e. the distance between the object and the lens.

In other words, said compatibility problem is to design an objective lens assembly suitable for scanning both in the first mode (e.g. a DVR-format disc) and in the second mode (e.g. a DVD-format disc), where a relatively small free working distance is available in the first mode. One solution to the compatibility problem is to provide the objective lens assembly with two separate sets of objective lens, one used for scanning in the first mode and the other for the second mode. The design of the objective lens assembly becomes of paramount importance, as well as pertaining concerns like space, cost, ease to manufacture and to handle.

Figure 1:
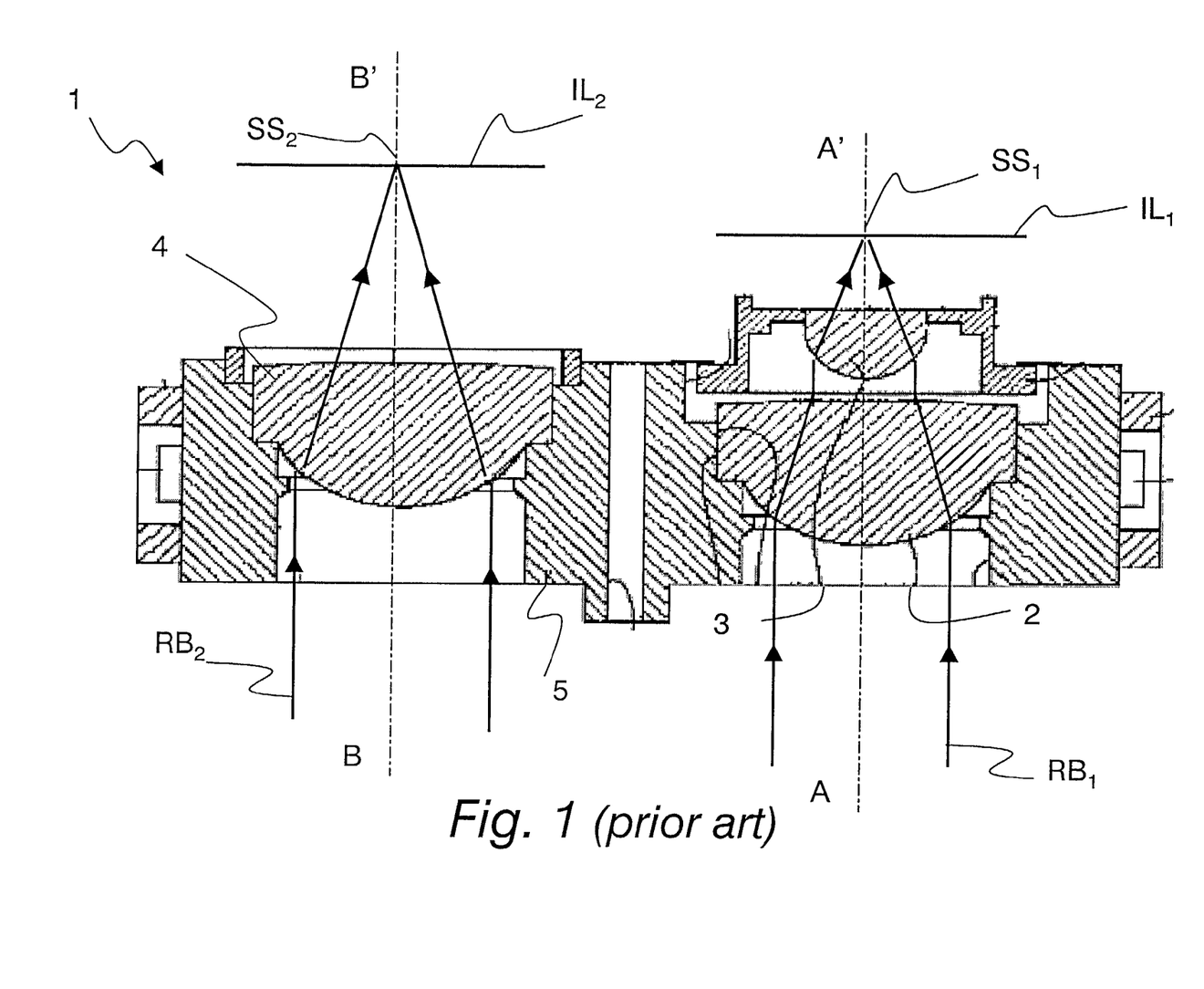
FIG. 1 shows a known objective lens assembly.

Japanese patent application no. 2001-067700 describes an optical scanning device as described in the opening paragraph, including an objective lens assembly having two separate sets of objective lenses. FIG. 1 of the present description shows the known objective lens assembly 1 for scanning a first information layer IL1 with a first radiation beam RB1 (first mode) and a second information layer IL2 with a second radiation beam RB2 (second mode). The known objective lens assembly 1 includes a first objective lens 2 with a large diameter, a second objective lens 3 with a smaller diameter and a third objective lens 4 with a large diameter. The lenses 2, 3 and 4 are mounted on a support element 5 so that the lenses 2 and 3 are aligned along an optical axis AA' and that the lens 4 is aligned along a different optical axis BB'. The lenses 2 and 3 transform the radiation beam RB1 to a first scanning spot SS1 on the information layer IL1 and the lens 4 transforms the radiation beam RB2 to a second scanning spot SS2 on the information layer IL2.

A disadvantage of the device described in JP 2001-067700 is that the objective lens assembly includes at least four components (the three lenses 2, 3 and 4 and the support element 5), thereby making the assembly relatively large which is detrimental, in particular with respect to the location of the assembly in the optical scanning device, where the minimization of the occupation of space by the components is a constant concern for the manufacturers of optical scanning devices.

Another disadvantage of the device described in JP 2001-067700 is that the objective lens assembly includes the four components to be assembled, thereby making the assembly relatively difficult to manufacture, especially in terms of alignment of the components with respect to their respective optical axes. The mounting is particularly critical because of the small diameter of the small lens 4 (typically a few millimeters) since the presence of a tilt between the objective lens and the information layer results in the generation of coma in the scanning spot. Such coma aberration is generally not desired since it negatively affects the scanning of the information layer.

Furthermore, the device described in JP 2001-067700 typically requires the objective lens assembly to be mounted in an actuator for controlling the positions of the first and second scanning spots with respect to: (1) the respective positions of the first and second information layers (2) and/or the position of a track of said first and second information layers which is to be scanned. The lenses 2, 3 and 4 must be adjusted along the respective optical axes during assembling. There are two manners for assembling the two separate objective lens sets: the first manner takes place outside of the actuator and the second manner inside the actuator. However, the first manner requires the use of an additional element for supporting the first, second and third objective lenses, thereby making the objective lens assembly relatively more expensive and voluminous which is not space-effective. The second manner has the disadvantage that, once the objective lenses are assembled in the actuator and fixed therein (e.g. glued), the rejection of the objective lens assembly for testing reasons results in the rejection of the actuator as well which is not cost-effective.

An object of the invention is to provide an optical scanning device as described in the opening paragraph, which is suitable for operating in both the first mode and the second mode while decreasing the cost of manufacturing.

This object is achieved with the optical scanning device as described in the opening paragraph wherein, according to the invention, the second and third objective lenses are integrally formed in one body.

An advantage of such a device is that it is compatible for scanning a first information layer of a first optical record carrier, e.g. a disc of the so-called DVR-format, and a second information layer of a second optical record carrier, e.g. a disc of the so-called DVD-format, while being cost-effective and easy to assemble since only two pieces (the first objective lens and the body) need be assembled in order to form the objective lens assembly.

Another advantage of such a device is that, once the first objective lens is assembled in the body, the optical axis of that lens can be substantially aligned with the optical axis of the second objective lens, before mounting the objective lens assembly in the actuator. Thus, the manufacturer can check whether the objective lens assembly complies with required specifications and, where necessary, reject the assembly before the mounting of the assembly in the actuator. Thus, the objective lens assembly can be tested outside of the actuator. Consequently, the rejection of the objective lens assembly does not require the rejection of the actuator, which is more cost-effective than the known objective lens assemblies.

Another advantage of such a device is to allow larger manufacturing tolerances, especially in respect of coma correction. The optical axis of the doublet-lens system can be adjusted with respect to the third objective lens by positioning the first objective lens in the body during assembling. If the third objective lens is oriented with respect to the normal direction of the record carrier so as to generate coma, the optical axis of the doublet-lens system can be positioned during assembling so as to be tilted with respect to that normal direction. Thus, also the doublet-lens system generates coma. The amount of coma generated by the doublet-lens-system can then be made to equal the amount of coma generated by the third lens. Subsequently, the objective lens assembly is mounted in the actuator and the actuator can be oriented with respect to the normal direction such that the amount of coma generated by the doublet-lens system and the third lens can compensate the amount of coma generated by a tilt of the optical record carrier. When the doublet-lens system and the third lens generate the same amount of coma the required disc tilt to compensate this coma is for both systems the same. Hence, a desired amount (preferably, a minimum) of coma is generated by the combination of the objective lens assembly and the optical record carrier.

Another advantage of such a device is that the objective lens assembly can be made of a smaller size than the lens assembly known from JP 2001-067700.

Figure 2:
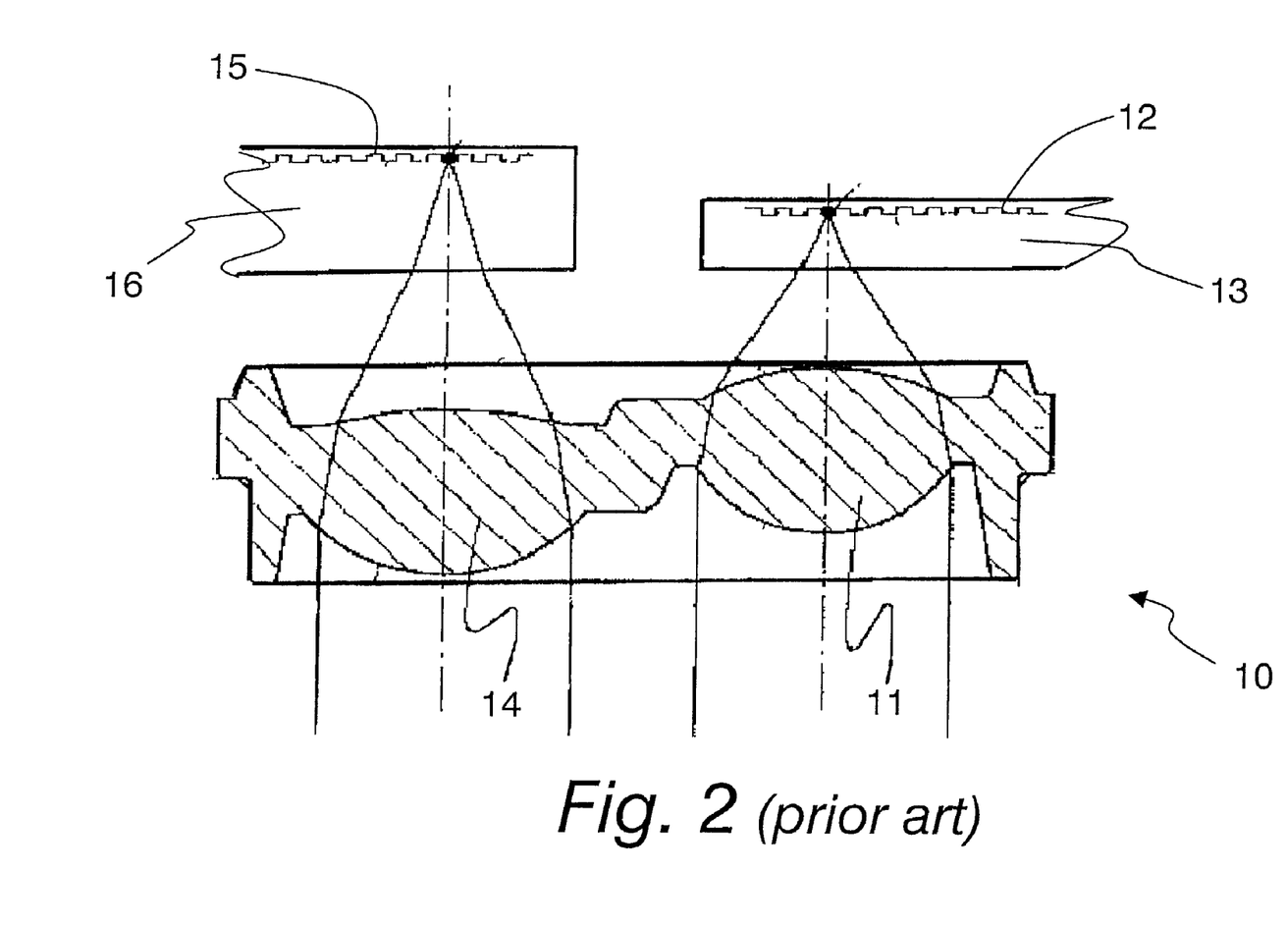
FIG. 2 shows a known objective lens assembly.

It has been noted in the Japanese patent application no. 09115170 discloses an optical scanning device including an objective lens assembly formed by one integrally molded element. FIG. 2 of the present description shows the known objective assembly. In FIG. 2, an objective lens assembly 10 comprises a first objective lens 11 suitable for scanning an information layer 12 of a DVD-format disc 13 and a second objective lens 14 suitable for scanning an information layer 15 of a CD-format disc 16. The lenses 11 and 14 are integrally molded in one single element. However, the lens assembly known from JP 09115170 is not compatible with optical record carriers having higher information density, like a DVR-format disc.

In a preferred embodiment of the objective lens assembly, the first diameter in respect of the first objective lens is larger than the second diameter in respect of the second objective lens. An advantage of such assembly is that it does not require the handling of small lenses, since the second, small objective lens (with a typical size of a few millimeters) is integrated with the third objective lens.

Another object of the invention is to provide an objective lens assembly as described in the opening paragraph, which is relatively small in size.

This object is achieved with the objective lens assembly for transforming a first radiation beam to a first converging radiation beam having a first numerical aperture and a second radiation beam to a second converging radiation beam having a second, smaller numerical aperture, the objective lens assembly including: (1) a doublet-lens system including a first objective lens with a cross-section having a first diameter and a second objective lens with a cross-section having a second diameter, the first and second objective lenses being arranged for transforming the first radiation beam to the first converging radiation beam, and (2) a third objective lens for transforming the second radiation beam to the second converging radiation beam, wherein, according to the invention, the second and third objective lenses are integrally formed in one body.

The objects, advantages and features of the invention will be apparent from the following, more detailed description of the invention, as illustrated in the accompanying drawings, in which:

FIG. 3A shows an optical scanning device 20 according to the invention, which is suitable for scanning a first information layer 21 of a first optical record carrier 22 with a first radiation beam 23. FIG. 3B shows the same optical scanning device 20 which is suitable for scanning a second information layer 24 of a second optical record carrier 25 with a second radiation beam 26. FIGS. 3A and 3B correspond to the first mode and the second mode, respectively, as described below.

Figure 3A:
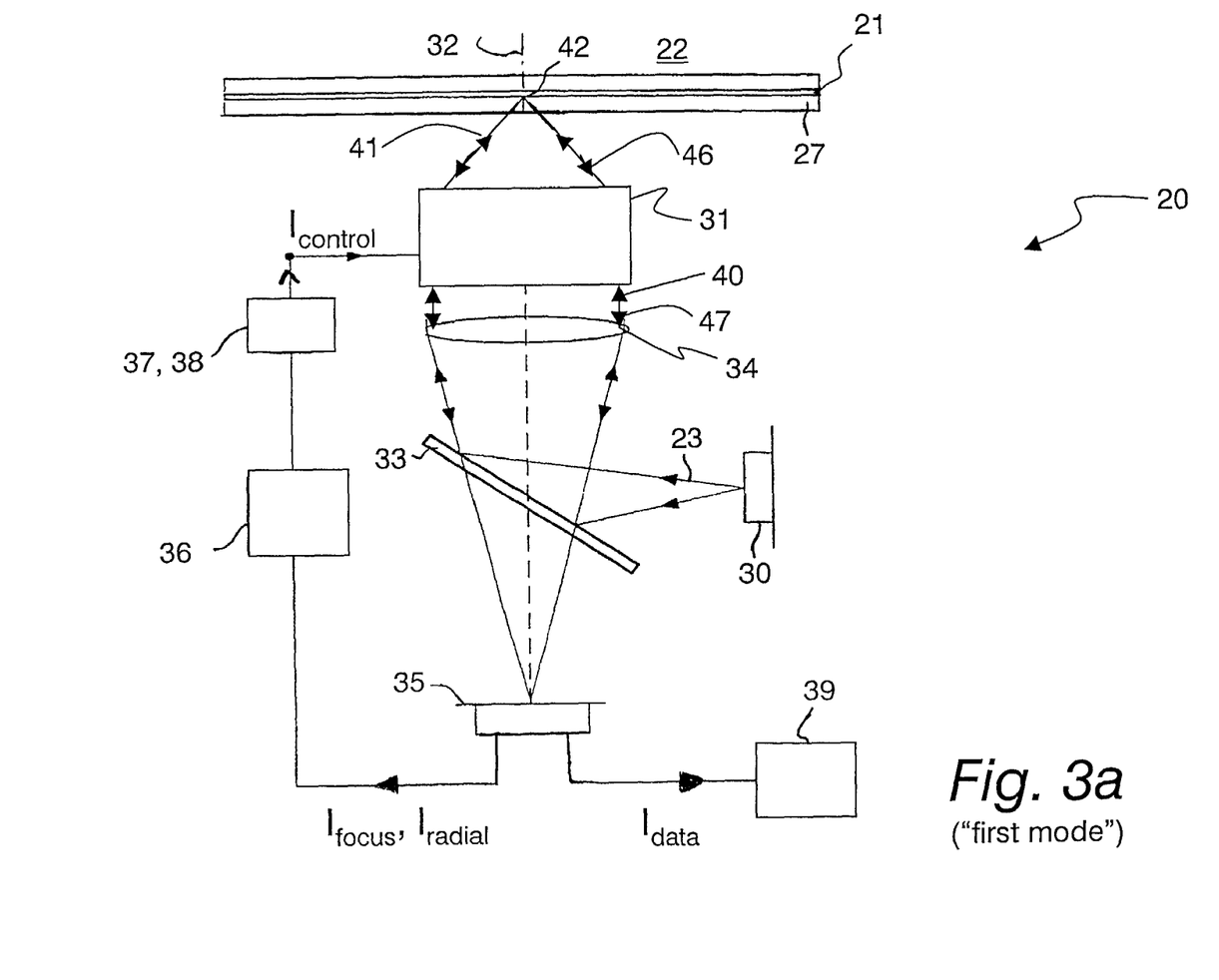
FIGS. 3A and 3B shows an optical scanning device according to the invention, in two different operating modes.
Figure 3B:
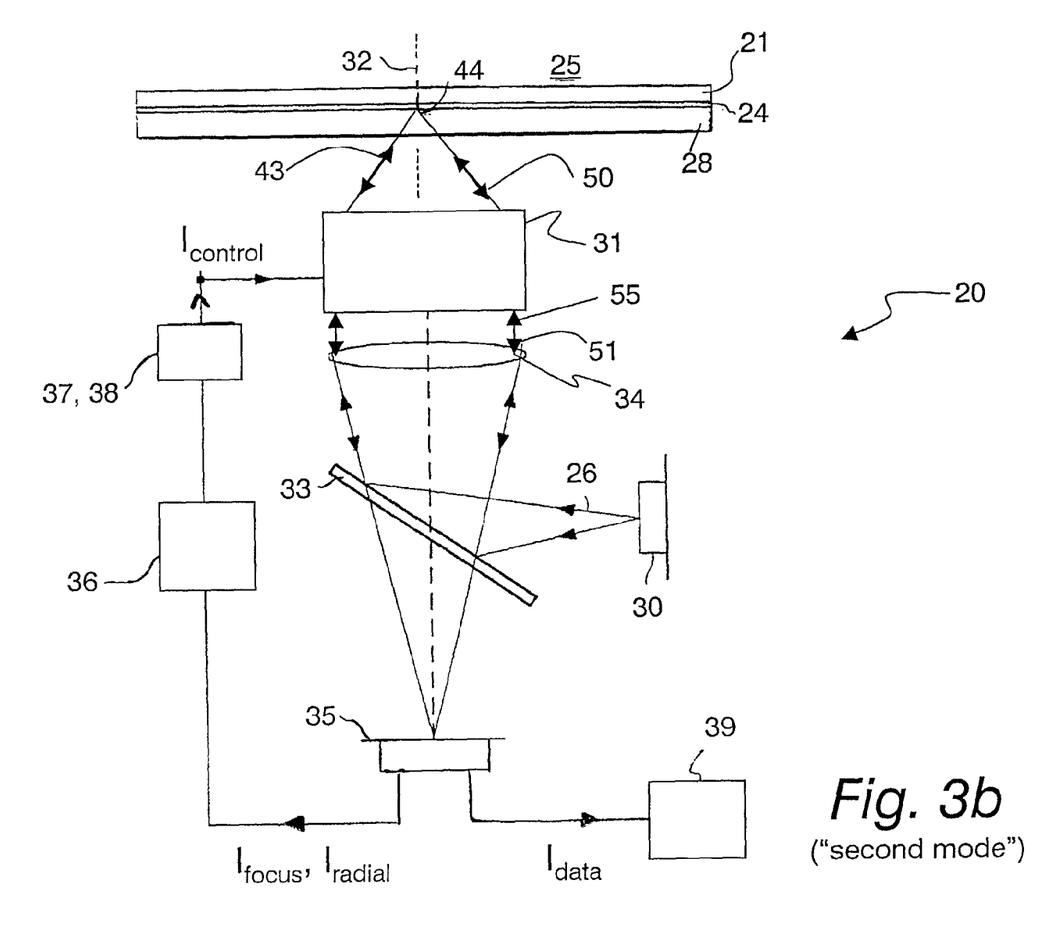

In the following, the first mode refers to an operating mode of the optical scanning device 20 for scanning the information layer 21 with the radiation beam having a first numerical aperture $NA_1$. The numerical aperture $NA_1$ is suitable for scanning an optical record carrier of a first type, e.g. the so-called DVR-format, having a first information density. The second mode refers to an operating mode of the optical scanning device 20 for scanning the information layer 24 with the radiation beam 24 having a second numerical aperture $NA_2$ that is smaller than the numerical aperture $NA_1$. The numerical aperture $NA_2$ is suitable for scanning an optical record carrier of a second type, e.g. the so-called DVD-format, having a second information density smaller than the first information density. In other words, the first mode corresponds to a mode of scanning a record carrier having a high information density and the second mode corresponds to a mode of scanning a record carrier having a low information density.

For instance, in the case where the optical record carrier 22 is of the so-called DVR-format, the numerical aperture $NA_1$ approximately equals 0.85 for both the reading mode and the writing mode. For instance, in the case where the optical record carrier 25 is of the DVD-format, the numerical aperture $NA_2$ approximately equals 0.60 for the reading mode and 0.65 for the writing mode.

With reference to FIG. 3A, the record carrier 22 comprises a transparent layer 27, one side of which is provided with the information layer 21. The side of the information layer 21 facing away from the transparent layer 27 may be protected from environmental influences by a protective layer. The transparent layer 27 acts as a substrate for the record carrier 22 by providing mechanical support for the information layer 21. Alternatively, the transparent layer 27 may have the sole function of protecting the information layer 21, while the mechanical support is provided by a layer on the other side of the information layer 21, for instance by the protective layer or by an additional information layer and transparent layer connected to the information layer 21. The information layer 21 is a surface of the record carrier 22 that contains tracks. A track is a path to be followed by a focused radiation beam on which path optically-readable marks that represent information are arranged. The marks may be, e.g., in the form of pits or areas having a reflection coefficient or a direction of magnetization different from the surroundings. By way of illustration only, in the case where the optical record carrier 22 is a DVR-format disc, the thickness of the transparent layer 27 approximately equals 0.1 mm.

Likewise, with reference to FIG. 3B, the record carrier 25 of the second type comprises a transparent layer 28, one side of which is provided with the information layer 24. The transparent layer 28 has a larger thickness than the transparent layer 27 of the optical record carrier 22 of the first type. By way of illustration only, in the case where the record carrier 45 is a DVD-format disc, the thickness of the transparent layer 46 approximately equals 0.6 mm.

As shown in FIGS. 3A and 3B, the optical scanning device 20 includes a radiation source 30 and an objective lens assembly 31 having an optical axis 32. The device further includes a beam splitter 33, a collimator lens 34, a detection system 35, a servosystem 36, a focus actuator 37, a radial actuator 38, and an information processing unit 39 for error correction.

The radiation source 30 is arranged for supplying the radiation beam 23 for scanning the information layer 21 of the first carrier 22 and the radiation beam 26 for scanning the information layer 24 of the second carrier 25. Preferably, the radiation source 30 includes at least a first semiconductor laser that emits the radiation beam 23 at a first selected wavelength $\lambda 1$ and a second semiconductor laser that emits the radiation beam 26 at a second selected wavelength $\lambda 2$. By way of illustration only, in the case where the first carrier 22 is a DVR-format disc, the wavelength $\lambda 1$ preferably equals 405 nm and, in the case where the second carrier 25 is a DVD-format disc, the wavelength $\lambda 2$ preferably equals 660 nm.

The beam splitter 33 is arranged for reflecting the radiation beams 23 and 26 toward the collimator lens 34. Preferably, the beam splitter 28 is formed by a plane parallel plate that is tilted with respect to the optical axis 32.

The collimator lens 34 is arranged for transforming the radiation beams 23 and 26 to a first collimated radiation beam 40 and a second collimated radiation beam 55, respectively.

The objective lens assembly 31 transforms the radiation beam 40 to a first focused radiation beam 41 having a first numerical aperture $NA_1$, so as to form a first scanning spot 42 in the position of the first information layer 21, and the radiation beam 55 to a second focused radiation beam 43 having a second numerical aperture $NA_2$, so as to form a second scanning spot 44 in the position of the second information layer 24. The objective lens assembly 32 is described in further detail below.

When the optical scanning device 20 operates in the first mode, the forward focused radiation beam 41 reflects on the information layer 21, thereby forming a backward diverging radiation beam 46 which returns on the optical path of the forward focused radiation beam 41. The objective lens assembly 31 transforms the backward radiation beam 46 to a first collimated backward radiation beam 47 which traverses the collimator lens 34.

The beam splitter 33 separates the forward radiation beam 23 from the backward radiation beam 47 by transmitting at least part of the backward radiation beam 47 towards the detection system 35.

Likewise, when the optical scanning device 20 operates in the second mode, the forward focused radiation beam 43 reflects on the information layer 24, thereby forming a backward diverging reflected beam 50 which returns on the optical path of the forward focused radiation beam 43. The objective lens assembly 31 transforms the backward radiation beam 50 to a backward collimated radiation beam 51. Finally, the beam splitter 33 separates the forward radiation beam 26 from the backward radiation beam 51 by transmitting at least part of the backward radiation beam 51 towards the detection system 35.

The detection system 35 is arranged for capturing the backward radiation beam 47, 51 and converting it into one or more electric signals. One of the signals is an information signal $I_{data}$, the value of which represents the information scanned from the information layer 21, 24. The information signal $I_{data}$ may be processed by the information processing unit 39 for error correction of the information extracted from the information layers 21, 24. Other signals from the detection system 35 are a focus error signal $I_{focus}$ and a radial tracking error signal $I_{radial}$. The signal $I_{focus}$ represents the axial difference in height along the optical axis 33 between the scanning spot 42, 44 and the information layer 21, 24; it is used for maintaining the scanning spot in focus in the information layer (as described below). The signal $I_{focus}$ is formed by the commonly used "astigmatic method" which is known from, inter alia, the book by G. Bouwhuis, J. Braat, A. Huijser et al, "Principles of Optical Disc Systems," pp. 75–80 (Adam Hilger 1985) (ISBN 0-85274-785-3). The signal $I_{radial}$ represents the distance in the plane of the information layer 21, 24 between the scanning spot 42, 44 and the center of a track in this information layer to be followed by this scanning spot; it is used for maintaining the scanning spot 42, 44 on track in the information layer 21, 24 as described below. The signal $I_{radial}$ is formed by the commonly used "radial push-pull method" which is known from, inter alia, said book by G. Bouwhuis et al., pp. 70–73.

The servosystem 36 is arranged for, in response to the signals $I_{focus}$ and $I_{radial}$, providing actuator control signals $I_{control}$ for controlling the focus actuator 37 and the radial actuator 38, respectively. The focus actuator 37 controls the positions of the objective lens assembly 31 along the optical axis 32, thereby controlling the actual positions of the scanning spots 42 and 44 such that they coincide substantially with the planes of the information layers 21 and 24, respectively. The radial actuator 38 controls the position of the objective lens assembly 31 in a direction perpendicular to the optical axis 32, thereby controlling the radial positions of the scanning spots 42 and 44 such that they coincide substantially with the center lines of the tracks to be followed in the information layers 21 and 24, respectively.

The objective lens assembly 31 is mounted in the actuator in a manner known in the art, for instance, by using a rotating actuator as described in JP 2001067700 or by using two prisms or dichroic mirrors as described in JP 09115170.

Figure 4:
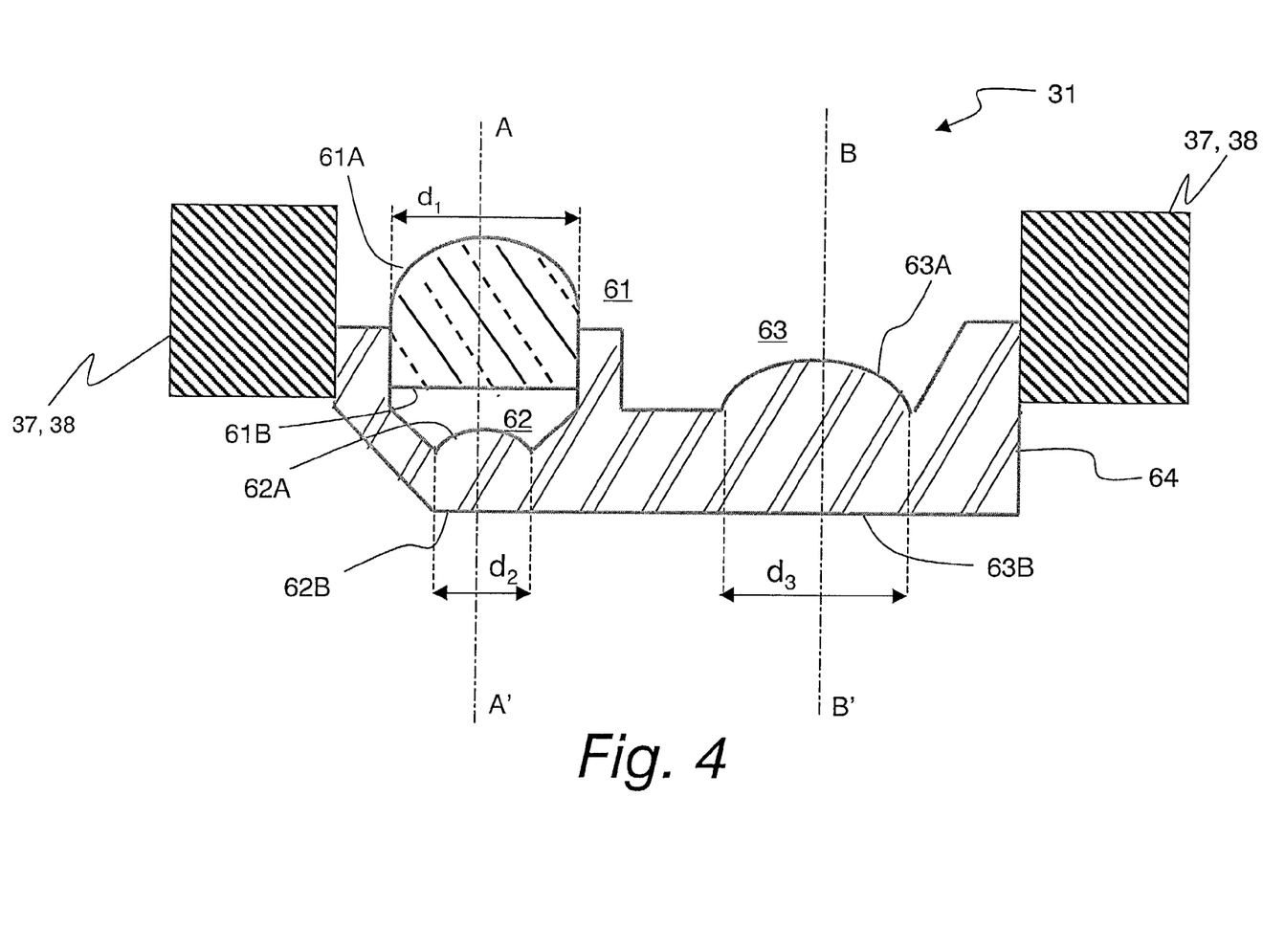
FIG. 4 shows a first embodiment of the objective lens assembly of FIG. 2, once assembled.

The objective lens assembly 31 is now described in further detail. FIG. 4 shows one embodiment of the objective lens assembly 31 of FIG. 3. The objective lens assembly 31A includes: (1) a doublet-lens system including a first objective lens 61 and a second objective lens 62, and (2) a third objective lens 63.

The structure of the doublet-lens system is known from WO 00/38182 for scanning a DVR-format disc and a DVD-format disc. The known structure has an optical axis and includes two objective lenses having each an optical axis aligned with the optical axis of the doublet-lens system. The two lenses are separated, along the optical axis of the doublet-lens system, by a distance which can be adjusted so that the spherical aberration arising when switching from a DVR-format disc to a DVD format disc, having a difference in thickness of the transparent layer, is compensated. It is noted that the doublet-lens system in WO 00/38182 has the disadvantage that, when the scanning spot is changed from the information layer of the DVR-format disc to the information layer of the DVD-format disc, the distance between the lenses in the doublet-lens system needs to be adjusted requiring an additional actuator. This additional actuator makes the system rather complicated and, therefore, difficult to manufacture.

Each of the lenses 61 and 62 has an optical axis aligned with the reference axis of the doublet-lens system, a reference axis AA'.

The lens 61 has an input surface 61A and an exit surface 61B; it further has a circular cross-section $S_1$ having a first diameter $d_1$. The lens 62 has an input surface 62A and an exit surface 62B; it further has a circular cross-section $S_2$ having a second diameter $d_2$ that is smaller than the diameter $d_1$. Likewise, the lens 63 has a circular cross-section $S_3$ having a third diameter $d_3$. In the present description, the "diameter" of a lens corresponds to the optically effective diameter of the lens, that is, the diameter within which an incident beam is transformed by the lens according to the specified properties of the lens. By way of illustration only, if the record carrier 22 is a DVR-format disc, the diameter $d_1$ is of the order of 3 mm and the diameter $d_2$ is of the order of 1.4 mm. If the record carrier 25 is a DVD-format disc, the diameter $d_3$ is of the order of 3.6 mm.

According to the invention, the objective lenses 62 and 63 are integrally formed in one body 64. For instance, the body 64 may be formed by using an injection molding process which is commonly used in the field of lens manufacturing. By way of illustration, the body 64 and therefore the lenses 62 and 63 are made of the same plastic material and the lens 61 is made of glass with an aspherical polymer layer on top of it, as shown in FIG. 4. The objective lens 61 shown in FIG. 4, in this example, is a plano-aspherical element. The objective lens 61 has thickness on the optical axis of 2.819 mm and entrance pupil diameter of 3.0 mm. The body of the objective is made of FK5 Schott glass with refractive index 1.4989 at wavelength of 405 nm. The convex surface of the lens body which is directed towards the collimator lens has radius 2.07 mm. The surface of the objective lens 61 facing objective lens 62 is flat. The aspherical shape of is realized in a thin layer of acryl on top of the glass body. The lacquer has refractive index 1.5987. The thickness of this layer on the optical axis is 0.019 mm. The rotational symmetric shape of the surfaces can be described by the equation $$z(r)=B_2 r^2+B_4 r^4+B_6 r^6+\ldots$$

with z being the position of the surface in the direction of the optical axis in millimeters, r the distance to the optical axis in millimeters, and $B_k$ the coefficient of the $k^{th}$ power of r. The value of the coefficients $B_2$ until $B_{16}$ are 0.26447094, 0.0088460392, 0.00014902273, 0.0014305415, −0.0015440542, 0.00082680417, −0.00023319199, 0.0000025911741, respectively. The objective lens 62 is made of COC (Topas) and is plano-aspherical. The refractive index of COC is 1.5499. The objective lens 62 has thickness on the optical axis of 0.9 mm and the beam entrance diameter of the objective lens 62 is 1.352 mm. The surface of the objective lens 62 facing the disc is flat. The rotational symmetric shape of the surface facing objective lens 61 can be described by the equation $$z(r)=B_2 r^2+B_4 r^4+B_6 r^6+\ldots$$

with z being the position of the surface in the direction of the optical axis in millimeters, r the distance to the optical axis in millimeters, and $B_k$ the coefficient of the $k^{th}$ power of r. The value of the coefficients $B_2$ until $B_{16}$ are 0.60369741, 0.22447301, 0.029061701, 0.33507029, −1.1373531, 3.5133805, −5.6443868, 3.1481201, respectively. The free working distance, hence the distance between the objective lens 62 and the disc is 0.15 mm. The disc has cover layer of 0.1 mm thickness made of Polycarbonate having refractive index 1.6223.

Objective lens 63 is also made of COC and bi-aspherical. The refractive index of COC at wavelength 660 nm is 1.5309. The objective lens 63 has thickness on the optical axis of 2.194 mm and the beam entrance diameter of the objective lens 63 is 3.3 mm. The rotational symmetric shape of the surfaces of objective lens 63 can be described by the equation $$z(r)=B_2 r^2+B_4 r^4+B_6 r^6+\ldots$$

with z being the position of the surface in the direction of the optical axis in millimeters, r the distance to the optical axis in millimeters, and $B_k$ the coefficient of the $k^{th}$ power of r. The value of the coefficients $B_2$ until $B_{16}$ for the surface facing the collimator lens are 0.30688174, 0.012537039, 7.46112311 $10^{-5}$, 0.00034483975, 6.5753831 $10^{-5}$, −0.00010465506, 2.3627344 $10^{-5}$, −1.2396363 $10^{-6}$, respectively. For the surface facing the disc these coefficients $B_2$ until $B_{16}$ are given by −0.1114228, 0.02852619, −0.0046668186, −0.0036752428, 0.0063619581, −0.007503492, 0.0046641069, −0.0010757204, respectively. The free working distance is 0.990 mm. The disc has a cover layer of 0.6 mm thickness made of Polycarbonate having refractive index 1.5796 at wavelength 660 nm.

Once the lens 61 is mounted in the body 64, the doublet-lens system formed by the lenses 61 and 62 transforms the first radiation beam 40 to the first focused radiation beam 41 having a first numerical aperture $NA_1$, so as to form the scanning spot 42 in the position of the information layer 21. The lens 63 transforms the second radiation beam 55 to the second focused radiation beam 43 having a second, smaller numerical aperture $NA_2$, so as to form the second scanning spot 44 in the position of the second information layer 24. The lens 63 has an input surface 63A and an exit surface 63B; it further has an optical axis BB'.

An advantage of the objective lens assembly 31, in addition to those mentioned above, is that the spacing between the optical axes AA' and BB' is decreased with respect to the spacing in the known objective lens assemblies, since (1) integration of the body and one objective lens set makes the objective lens assembly smaller and (2) the integrated body does not require additional element for supporting the first, second and third objective lenses. This is advantageous in comparison with the known objective lens assemblies where two separate objective lens sets need be mounted in an additional body.

The assembling of the objective lens assembly of FIG. 4 is now described.

Figure 5:
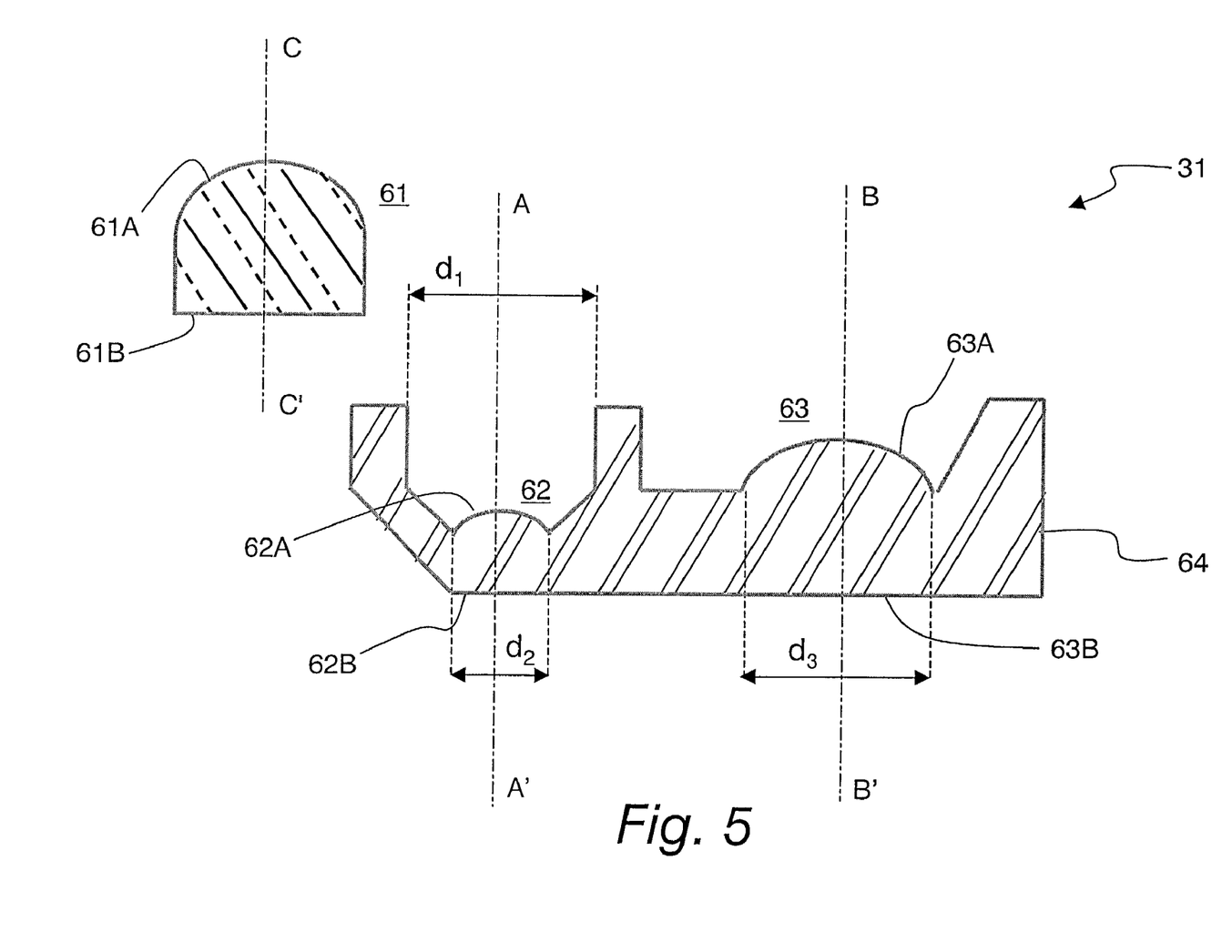
FIG. 5 shows the objective lens assembly of FIG. 4, once disassembled.

FIG. 5 shows the disassembled objective lens assembly 31 of FIG. 4 where the first lens 61 has an optical axis CC' and the second lens 62 has an optical axis which is the reference axis of the doublet-lens system, the reference axis AA'.

Firstly, the coma aberration generated by the lens 63 of the body 64 is measured by known techniques.

Secondly, the lens 61 is mounted in the body 64 so that the optical axes CC', AA' and BB' are aligned so as to meet predetermined specifications. Meanwhile, the amount of coma generated by the doublet-lens system formed by the lenses 61 and 62 is measured. Thus, the lens 61 is positioned so that the doublet-lens system generates the same amount of coma than the amount generated by the lens 63.

Thirdly, the distance between the lenses 61 and 62 is adjusted so that the radiation beam emerging from the doublet-lens system has a fixed value of spherical aberration. For instance, that fixed value may compensate the amount of spherical aberration generated by the optical record carrier. It is noted that the optical properties of the objective lenses are improved when making more surfaces aspherical, e.g., the exit surface of the first objective lens or of the second objective lens aspherically curved as shown, e.g., in the article by B. H. W. Hendriks and P. G. J. M. Nuyens, "Designs and manufacturing of far-field high NA objective lenses for optical recording," 413–414, SPIE 3749 (1999).

Fourthly, the lens 61 is fixed, e.g. glued, to the body 64.

It is noted that the measurements are done before the mounting of the objective lens assembly 31 in the actuator, which has the advantage that the objective lens assembly can be checked beforehand and, where necessary, can be rejected before assembly. This is cost-effective since the rejection of the objective lens assembly already assembled (glued) but not mounted in the actuator does not require the rejection of the actuator.

It is to be appreciated that numerous variations and modifications may be employed in relation to the embodiments described above, without departing from the scope of the invention which is defined in the appended claims.

Figure 6:
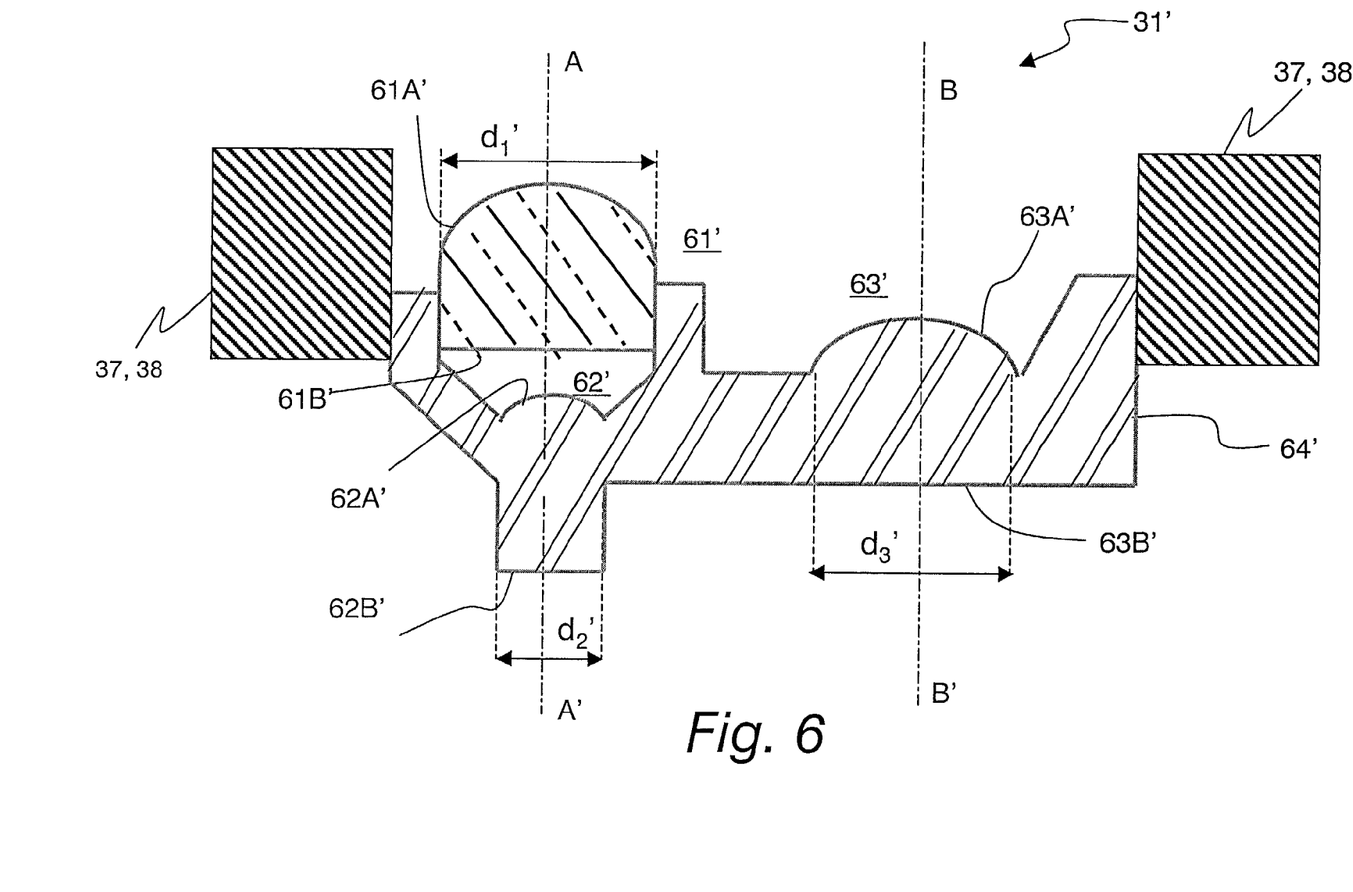
FIG. 6 shows an alternative embodiment of the objective lens assembly of FIG. 4, once assembled.

FIG. 6 shows an alternative embodiment 31' of the objective lens assembly 31 shown in FIG. 4. As shown in FIG. 6, the objective lens assembly 31' is arranged so that the exit surface 62B' of the lens 62' and the exit surface 63B' of the lens 63' are in two different planes. An advantage of the second embodiment is that the position of the exit surface 62B' can be chosen so that the position of the objective lens assembly 31' does not need to be changed along the optical axis, in order to keep both scanning spots 42 and 44 in focus with the information layers 21 and 24, respectively.

A second alternative embodiment 31" (not shown) of the objective lens assembly 31 of FIG. 4 will be described. Similarly to the objective lens assembly 31 shown in FIG. 4, the objective lens assembly 31" includes a first objective lens 62", a second objective lens 61" and a third objective lens 63", wherein the second and third lenses are integrally formed in one body 64".

In an alternative embodiment of the optical scanning device, radiation beams having different wavelengths and numerical apertures than those described above may be used. For instance, the optical scanning device may be formed to be suitable for scanning, e.g., both a DVD-format disc and a CD-format disc, or both a DVR-format disc and a CD-format disc.

In an alternative embodiment of the optical scanning device, the third objective lens may be further arranged for compatibility with both a CD-format disc and a DVD-format disc. For instance, such compatibility can be achieved by adding a non-periodic phase structure as described in the European patent application no. 0.865.037 or a grating structure as described in the proceedings of the 2000 International Conference on Optical Design and Fabrication (see K. Maruyama and R. Ogawa, *Background of Conception of DVD/CD compatible diffractive lens*, pp. 93–96, Optical Society of Japan (2000)).

In another alternative embodiment of the optical scanning device, the optical scanning device may be of the type capable of performing simultaneous multi-track scanning. This results in improving the data rate in the reading mode as described, for example, in U.S. Pat. No. 4,449,212.

The invention claimed is:

1. An objective lens assembly for transforming a first radiation beam to a first converging radiation beam having a first numerical aperture and a second radiation beam to a second converging radiation beam having a second, smaller numerical aperture, the objective lens assembly comprising:

a doublet-lens system including a first objective lens with a first cross-section having a first diameter and a second objective lens with a second cross-section having a second diameter, said first and second objective lenses being arranged for transforming said first radiation beam to said first converging radiation beam, and a third objective lens, integrally formed from the same body as the second objective lens, the third objective lens being for transforming said second radiation beam to said second converging radiation beam.

2. An objective lens assembly for transforming a first radiation beam to a first converging radiation beam having a first numerical aperture and a second radiation beam to a second converging radiation beam having a second, smaller numerical aperture, the objective lens assembly including:
a doublet-lens system including a first objective lens with a first cross-section having a first diameter and a second objective lens with a second cross-section having a second diameter, said first and second objective lenses being arranged for transforming said first radiation beam to said first converging radiation beam, and
a third objective lens for transforming said second radiation beam to said second converging radiation beam,
characterized in that said second and third objective lenses are integrally formed in one body.

3. An optical scanning device for scanning a first information layer of a first optical record carrier with a first radiation beam and a second information layer of a second optical record carrier with a second radiation beam, the device including a radiation source for supplying said first and second radiation beams, and an objective lens assembly including:
a doublet-lens system including a first objective lens with a first cross-section having a first diameter and a second objective lens with a second cross-section having a second diameter, said first and second objective lenses being arranged for transforming said first radiation beam to a first focused radiation beam having a first numerical aperture, to form a first scanning spot in the position of said first information layer, and
a third objective lens for transforming said second radiation beam to a second focused radiation beam having a second, smaller numerical aperture, to form a second scanning spot in the position of said second information layer,
characterized in that said second and third objective lenses are integrally formed in one body.

4. The optical scanning device as claimed in claim 3, wherein said objective lens assembly is arranged so that said first diameter is larger than said second diameter.

5. The optical scanning device as claimed in claim 3, wherein said objective lens assembly is arranged so that said first diameter is smaller than said second diameter.

6. The optical scanning device as claimed in claim 3, further including a detection system arranged for providing a focus error signal ($I_{focus}$) and/or a radial-tracking error signal ($I_{radial}$), a servosystem and an actuator responsive to said focus error signal and/or said radial-tracking error signal for controlling the positions of said first and second scanning spots with respect to the respective positions of said first and second information layers and/or of a track of said first and second in formation layers which is to be scanned.

7. The optical scanning device as claimed in claim 3, further including an information processing unit for error correction of the information extracted from said first or second information layer.

8. An optical scanning device for scanning a first information layer of a first optical record carrier with a first radiation beam and a second information layer of a second optical record carrier with a second radiation beam, the device including
a radiation source for supplying said first and second radiation beams, and
an objective lens assembly including:
a doublet-lens system including a first objective lens with a first cross-section having a first diameter and a second objective lens with a second cross-section having a second diameter, said first and second objective lenses being arranged for transforming said first radiation beam to a first focused radiation beam having a first numerical aperture, to form a first scanning spot in the position of said first information layer, and
a third objective lens for transforming said second radiation beam to a second focused radiation beam having a second, smaller numerical aperture, to form a second scanning spot in the position of said second information layer,
wherein
said second and third objective lenses are integrally formed in one body, and
each of said second and third objective lenses has an exit surface facing the position of the information layer to be scanned and in that the exit surface of said second objective lens is in the same plane as the exit surface of said third objective lens.

9. An optical scanning device for scanning a first information layer of a first optical record carrier with a first radiation beam and a second information layer of a second optical record carrier with a second radiation beam, the device including
a radiation source for supplying said first and second radiation beams, and
an objective lens assembly including:
a doublet-lens system including a first objective lens with a first cross-section having a first diameter and a second objective lens with a second cross-section having a second diameter, said first and second objective lenses being arranged for transforming said first radiation beam to a first focused radiation beam having a first numerical aperture, to form a first scanning spot in the position of said first information layer, and
a third objective lens for transforming said second radiation beam to a second focused radiation beam having a second, smaller numerical aperture, to form a second scanning spot in the position of said second information layer,
wherein
said second and third objective lenses are integrally formed in one body, and
each of said second and third objective lenses has an exit surface facing the position of the information layer to be scanned and in that the exit surface of said second objective lens is in a different same plane as the exit surface of said third objective lens.

10. A method of producing an objective lens system for an optical scanning device, the method comprising:
providing a first lens;
providing second and third lenses, which second and third lenses are integrally formed from a single body;
assembling the first lens with the single body;
the lenses and assembly being such that
the first and second lens form a doublet-lens system for transforming a first radiation beam to a first focused radiation beam having a first numerical aperture for forming a first scanning spot in a first information layer of a first type optical record carrier; and
the third lens is suitable for transforming a second radiation beam to a second focused radiation beam having a second, smaller numerical aperture for forming a second scanning spot in a second information layer of a second type of optical record carrier.

* * * * *